United States Patent
Chen

(10) Patent No.: US 10,110,276 B2
(45) Date of Patent: Oct. 23, 2018

(54) CONNECTION/DISCONNECTION METHOD AND APPARATUS

(71) Applicant: Huawei Technologies Co., Ltd., Shenzhen (CN)

(72) Inventor: Xi Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/323,622

(22) PCT Filed: Jul. 8, 2014

(86) PCT No.: PCT/CN2014/081845
§ 371 (c)(1),
(2) Date: Jan. 3, 2017

(87) PCT Pub. No.: WO2016/004582
PCT Pub. Date: Jan. 14, 2016

(65) Prior Publication Data
US 2017/0141816 A1    May 18, 2017

(51) Int. Cl.
*G06K 7/08*  (2006.01)
*H04B 5/00*  (2006.01)
(Continued)

(52) U.S. Cl.
CPC .......... *H04B 5/0031* (2013.01); *G06K 7/087* (2013.01); *H01F 38/14* (2013.01); *H01Q 7/08* (2013.01); *H01F 2038/143* (2013.01)

(58) Field of Classification Search
CPC ......... H04B 5/0031; G06K 7/087; H01Q 7/08
(Continued)

(56) References Cited

U.S. PATENT DOCUMENTS 8,145,261 B2    3/2012  Wang et al.
8,406,810 B1 *  3/2013  Kamal ................ H04M 1/0202
                                                         455/406
(Continued)

FOREIGN PATENT DOCUMENTS

CN    201243339 Y    5/2009
CN    103904483 A    7/2014
(Continued)

OTHER PUBLICATIONS

Machine Translation and Abstract of Chinese Publication No. CN201243339, dated May 20, 2009, 7 pages.
(Continued)

*Primary Examiner* — Paultep Savusdiphol
(74) *Attorney, Agent, or Firm* — Conley Rose, P.C.

(57) ABSTRACT

A connection/disconnection method, including detecting, by an electronic device, a change of a magnetic flux of a first magnetic field in the electronic device, generating a first electric signal according to the change of the magnetic flux, where the first magnetic field is generated by an electronic component, a magnetic force of the first magnetic field is used to drive the electronic component to be connected to the electronic device, determining, by the electronic device, whether identification information of the target connection component is the same as a preset identifier when a change of the first electric signal meets a first preset model, and driving, by the electronic device, the electronic component to be disconnected from the electronic device when the identification information of the target connection component is different from the preset identifier.

17 Claims, 8 Drawing Sheets

(51) Int. Cl.
*H01Q 7/08* (2006.01)
*H01F 38/14* (2006.01)

(58) Field of Classification Search
USPC .......................................... 235/449, 450, 493
See application file for complete search history.

(56) References Cited

U.S. PATENT DOCUMENTS

| | | | |
|---|---|---|---|
| 2002/0120857 A1* | 8/2002 | Krishnan ............... | H04M 17/02 |
| | | | 713/193 |
| 2004/0087339 A1 | 5/2004 | Goldthewaite et al. | |
| 2009/0167498 A1* | 7/2009 | Fukuda ............ | G06K 19/07749 |
| | | | 340/10.1 |
| 2011/0012727 A1* | 1/2011 | Pance ................. | G06F 13/4068 |
| | | | 340/505 |
| 2011/0192857 A1 | 8/2011 | Rothbaum et al. | |
| 2014/0179135 A1 | 6/2014 | Hsu | |

FOREIGN PATENT DOCUMENTS

| | | |
|---|---|---|
| GB | 2398706 A | 8/2004 |
| JP | 2001056850 A | 2/2001 |
| JP | 2012533789 A | 12/2012 |
| JP | 2013013149 A | 1/2013 |
| WO | 2007043626 A1 | 4/2007 |
| WO | 2008136638 A1 | 11/2008 |

OTHER PUBLICATIONS

"Digital cellular telcommunications system (Phase 2+); Specification of the Subscriber Identity Module—Mobile Equipment (SIM-ME) Interface (3GPP TS 11.11 version 8.14.0 Release 1999)," ETSI TS 100 977, V8.14.0, Technical Specification, Jun. 2007, 180 pages.
Foreign Communication From A Counterpart Application, European Application No. 14897255.7, Extended European Search Report dated May 2, 2017, 10 pages.
Foreign Communication From A Counterpart Application, PCT Application No. PCT/CN2014/081845, English Translation of International Search Report dated Mar. 27, 2015, 2 pages.
Foreign Communication From A Counterpart Application, PCT Application No. PCT/CN2014/081845, English Translation of Written Opinion dated Mar. 27, 2015, 10 pages.
Machine Translation and Abstract of Japanese Publication No. JP2001056850, dated Feb. 27, 2001, 13 pages.
Foreign Communication From A Counterpart Application, Japanese Application No. 2017-500985, Japanese Notice of Allowance dated May 22, 2018, 3 pages.
Foreign Communication From a Counterpart Application, Korean Application No. 2017-500985, Korean Office Action dated Feb. 13, 2018, 4 pages.
Foreign Communication From a Counterpart Application, Korean Application No. 2017-500985, English Translation of Korean Office Action dated Feb. 13, 2018, 5 pages.

\* cited by examiner

CONNECTION/DISCONNECTION METHOD AND APPARATUS

CROSS-REFERENCE TO RELATED APPLICATION

This application is a U.S. National Stage of International Patent Application No. PCT/CN2014/081845 filed on Jul. 8, 2014, which is incorporated herein by reference in its entirety.

TECHNICAL FIELD

The present disclosure relates to the field of electronic design, and in particular, to a connection/disconnection method and apparatus.

BACKGROUND

With rapid development of technologies, requirements of a user for various products are no longer reflected only in functionality. Requirements for product operation experience, artistry, and security in using a product are becoming higher.

In other approaches, a card installed in a slot of an electronic device can be used normally in the electronic device no matter whether the card is authorized. In addition, a connection/disconnection structure between an existing electronic device and an electronic component interface is mostly mechanical, namely, the electronic device uses a mechanical lever to control connection/disconnection between the electronic device and the electronic component interface such that a user can implement connection/disconnection between the electronic device and the electronic component interface by triggering the mechanical lever and further change a card installed in the slot of the electronic device. For example, the electronic device is connected to a subscriber identity module (SIM) slot or a secure digital memory card (SD) slot using a mechanical lever. By triggering the mechanical lever, the user may directly change a card installed in the slot of the electronic device.

However, with the mechanical connection/disconnection structure, the user can change the card installed in the slot of the electronic device by only triggering the mechanical lever. Therefore, an unauthorized card can also be installed in the electronic device and used normally, which may lead to leakage of information in the electronic device and also low security of the electronic device.

SUMMARY

Embodiments of the present disclosure provide a connection/disconnection method and apparatus in order to resolve a problem of low security of an electronic device in a current mechanical connection/disconnection technology and improve the security of the electronic device.

To achieve the foregoing objective, the following technical solutions are used in the embodiments of the present disclosure According to a first aspect, an embodiment of the present disclosure provides an electronic device, including a magnetic medium, a coil that encircles a side of the magnetic medium, and a processor connected to both ends of the coil, where the magnetic medium is configured to be magnetized by a first magnetic field generated by the electronic component, and be connected to the electronic component under an effect of a magnetic force of the first magnetic field when the electronic device detects connection of an electronic component, where the electronic component accommodates or is connected to a target connection component. The coil is configured to generate a first electric signal according to a change of a magnetic flux in the coil under an effect of the first magnetic field, where the first electric signal is used to drive the processor to determine whether identification information of the target connection component accommodated in or connected to the electronic component is the same as a preset identifier, and the processor is configured to detect the change of the magnetic flux, determine whether the identification information of the target connection component is the same as the preset identifier if a change of the first electric signal meets a first preset model, and drive the electronic component to be disconnected from the electronic device if the identification information of the target connection component is different from the preset identifier.

In a first possible implementation manner of the first aspect, the processor is further configured to generate a first control signal if the identification information is the same as the preset identifier, and the coil is configured to generate a second electric signal according to the first control signal, and generate a second magnetic field using the second electric signal, where a magnetic force of the second magnetic field is used to drive the electronic component to be fixedly connected to the electronic device.

With reference to the first possible implementation manner of the first aspect, in a second possible implementation manner of the first aspect, the processor is further configured to obtain instruction information, where the instruction information is used to drive the electronic component to be disconnected from the electronic device, and drive the electronic component to be disconnected from the electronic device after obtaining the instruction information.

With reference to the second possible implementation manner of the first aspect, in a third possible implementation manner of the first aspect, the processor is further configured to determine whether the instruction information is the same as instruction verification information after obtaining the instruction information, and driving the electronic component to be disconnected from the electronic device after obtaining the instruction information includes drive the electronic component to be disconnected from the electronic device if the instruction information is the same as the instruction verification information.

With reference to the first aspect or any possible implementation manner of the first possible implementation manner to the third possible implementation manner of the first aspect, in a fourth possible implementation manner of the first aspect, the processor is further configured to generate a second control signal if the identification information is different from the preset identifier, and the coil is further configured to generate a third electric signal according to the second control signal, and generate the second magnetic field using the third electric signal, where the magnetic force of the second magnetic field is used to drive the electronic component to be disconnected from the electronic device.

With reference to the fourth possible implementation manner of the first aspect, in a fifth possible implementation manner of the first aspect, the processor is further configured to detect whether a change of the third electric signal meets a second preset model, and drive the coil to stop generating the third electric signal if the change of the third electric signal meets the second preset model.

With reference to the first aspect or any possible implementation manner of the first to fifth possible implementation manners of the first aspect, in a sixth possible implementation manner of the first aspect, the target connection component is a data card or a memory card, and the identification information of the target connection component is a serial number or an identity (ID) of the target connection component.

According to a second aspect, an embodiment of the present disclosure provides an electronic component, including a permanent magnet apparatus that includes an electronic interface, where the permanent magnet apparatus is configured to generate a first magnetic field, where a magnetic force of the first magnetic field is used to drive the electronic component to be connected to the electronic device when the electronic component is being connected to an electronic device, and the electronic interface is configured to accommodate or be connected to a target connection component, where the target connection component is used by the electronic device to perform communication or used to perform data transmission with the electronic device.

In a first possible implementation manner of the second aspect, the electronic interface is a slot, and the slot is rigidly connected to the permanent magnet apparatus.

With reference to the second aspect or the first possible implementation manner of the second aspect, in a second possible implementation manner of the second aspect, the target connection component is a data card or a memory card.

According to a third aspect, an embodiment of the present disclosure provides user equipment, including at least an electronic device with any characteristic described in the first aspect and an electronic component with any characteristic described in the second aspect.

According to a fourth aspect, an embodiment of the present disclosure provides a connection/disconnection method, including detecting, by an electronic device, a change of a magnetic flux of a first magnetic field in the electronic device, and generating a first electric signal according to the change of the magnetic flux, where the first magnetic field is generated by an electronic component, a magnetic force of the first magnetic field is used to drive the electronic component to be connected to the electronic device, and the electronic component accommodates or is connected to a target connection component, determining, by the electronic device, whether identification information of the target connection component is the same as a preset identifier if a change of the first electric signal meets a first preset model, and driving, by the electronic device, the electronic component to be disconnected from the electronic device if the identification information of the target connection component is different from the preset identifier.

In a first possible implementation manner of the fourth aspect, the method further includes generating, by the electronic device, a second electric signal if the identification information is the same as the preset identifier such that the electronic device generates a second magnetic field using the second electric signal, where a magnetic force of the second magnetic field is used to drive the electronic component to be fixedly connected to the electronic device.

With reference to the first possible implementation manner of the fourth aspect, in a second possible implementation manner of the fourth aspect, the method further includes obtaining instruction information, where the instruction information is used to drive the electronic component to be disconnected from the electronic device, and driving, according to the instruction information, the electronic component to be disconnected from the electronic device.

With reference to the second possible implementation manner of the fourth aspect, in a third possible implementation manner of the fourth aspect, the method further includes determining whether the instruction information is the same as instruction verification information, and driving, according to the instruction information, the electronic component to be disconnected from the electronic device includes driving the electronic component to be disconnected from the electronic device if the instruction information is the same as the instruction verification information.

With reference to the fourth aspect or any possible implementation manner of the first possible implementation manner to the third possible implementation manner of the fourth aspect, in a fourth possible implementation manner of the fourth aspect, the target connection component is a data card or a memory card, and the identification information of the target connection component is a serial number or an ID of the target connection component.

According to a fifth aspect, an embodiment of the present disclosure provides an electronic device, including a detection unit configured to detect a change of a magnetic flux of a first magnetic field in the electronic device, where the first magnetic field is generated by an electronic component, a magnetic force of the first magnetic field is used to drive the electronic component to be connected to the electronic device, and the electronic component accommodates or is connected to a target connection component, a generation unit configured to generate a first electric signal according to the change of the magnetic flux detected by the detection unit, a determining unit configured to determine whether identification information of the target connection component is the same as a preset identifier if a change of the first electric signal generated by the generation unit meets a first preset model, and a driving unit configured to drive the electronic component to be disconnected from the electronic device if the determining unit determines that the identification information of the target connection component is different from the preset identifier.

In a first possible implementation manner of the fifth aspect, the generation unit is further configured to generate a second electric signal if the determining unit determines that the identification information is the same as the preset identifier such that the electronic device generates a second magnetic field using the second electric signal, where a magnetic force of the second magnetic field is used to drive the electronic component to be fixedly connected to the electronic device.

With reference to the first possible implementation manner of the fifth aspect, in a second possible implementation manner of the fifth aspect, the electronic device further includes an obtaining unit. The obtaining unit is configured to obtain instruction information, where the instruction information is used to drive the electronic component to be disconnected from the electronic device, and the driving unit is further configured to drive, according to the instruction information obtained by the obtaining unit, the electronic component to be disconnected from the electronic device.

With reference to the second possible implementation manner of the fifth aspect, in a third possible implementation manner of the fifth aspect, the determining unit is further configured to determine whether the instruction information obtained by the obtaining unit is the same as instruction verification information, and the driving unit is further configured to drive the electronic component to be disconnected from the electronic device if the determining unit determines that the instruction information is the same as the instruction verification information.

With reference to the fifth aspect or any possible implementation manner of the first possible implementation manner to the third possible implementation manner of the fifth aspect, in a fourth possible implementation manner of the fifth aspect, the target connection component is a data card or a memory card, and the identification information of the target connection component is a serial number or an ID of the target connection component.

According to a sixth aspect, an embodiment of the present disclosure provides an electronic component, including a permanent magnet unit configured to generate a first magnetic field, where a magnetic force of the first magnetic field is used to drive the electronic component to be connected to the electronic device when the electronic component is being connected to an electronic device, and an input/output unit configured to be connected to a target connection component, where the target connection component is used by the electronic device to perform communication or used to perform data transmission with the electronic device.

In a first possible implementation manner of the sixth aspect, the target connection component is a data card or a memory card.

The embodiments of the present disclosure provide a connection/disconnection method and apparatus. An electronic device detects a change of a magnetic flux of a first magnetic field in the electronic device, and generates a first electric signal according to the change of the magnetic flux, where the first magnetic field is generated by an electronic component, a magnetic force of the first magnetic field is used to drive the electronic component to be connected to the electronic device, and the electronic component accommodates or is connected to a target connection component. From electromagnetic induction principles, it can be learned that the change of the magnetic flux of the first magnetic field in the electronic device may cause the electronic device to generate a first electric signal, where the first magnetic field is generated by the electronic component, and the change of the magnetic flux may cause a change of the first electric signal. The electronic device determines whether identification information of the target connection component is the same as a preset identifier if the change of the first electric signal meets a first preset model, and the electronic device drives the electronic component to be disconnected from the electronic device if the identification information of the target connection component is different from the preset identifier.

Using this solution, the electronic device completes, by means of program logic control, determining whether the target connection component accommodated in or connected to the electronic component has been authorized, namely, determining whether the identification information of the target connection component is the same as the preset identifier. The electronic device drives the electronic component to be disconnected from the electronic device if determining that the target connection component is not authorized. In this way, it is ensured that an unauthorized target connection component cannot be normally used after the target connection component is connected to the electronic device, thereby improving security of the electronic device.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
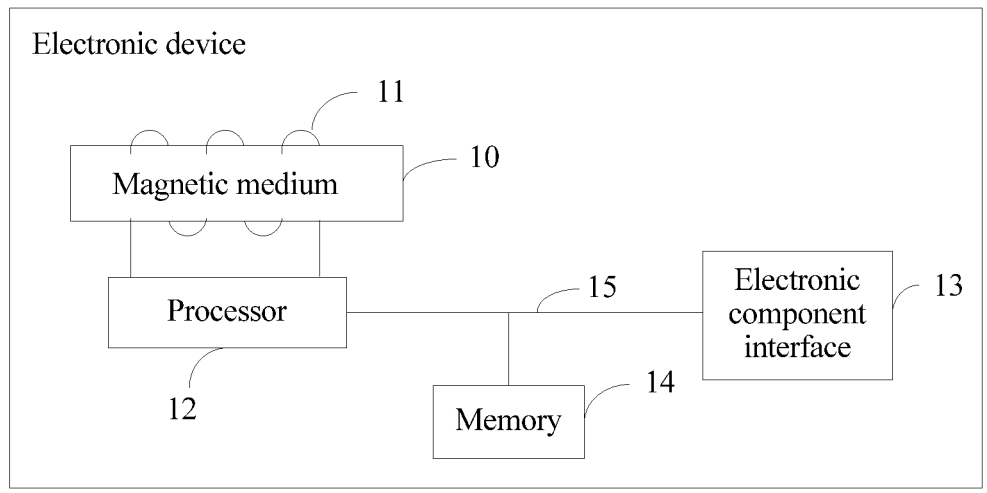
FIG. 1 is a schematic structural diagram of an electronic device according to an embodiment of the present disclosure.

This embodiment of the present disclosure provides an electronic device. As shown in FIG. 1, the electronic device may include a magnetic medium 10, a coil 11, a processor 12, an electronic component interface 13, a memory 14, and a system bus 15, where the coil 11 encircles a side of the magnetic medium 10, the processor 12 is connected to both ends of the coil 11, and connection and communication are implemented between the processor 12, the memory 14, and the electronic component interface 13 using the system bus 15.

The memory 14 may be a high-speed random access memory (RAM), or may be a non-volatile memory such as at least one disk memory. The memory 14 is configured to store a first electric signal generated by the electronic device, a first preset model, a second preset model, and the like.

The electronic component interface 13 may be configured to be connected to an external electronic component, and enable the electronic device to perform communication or data transmission over the electronic component interface 13 using a target connection component in the external electronic component. For example, using the electronic component interface, the electronic device may read data on a memory card accommodated in a slot.

It should be noted that the electronic device in the embodiment of the present disclosure may be any apparatus that includes a user interface, which is not limited by the embodiment of the present disclosure. For example, the electronic device may be a mobile phone on which no SIM card slot is installed, may be a mobile phone to which no headset is connected, or may be an electronic device without an anti-theft lock on an electronic exhibition booth.

The electronic device may be a mobile phone (or referred to as a "cellular" phone), or may be a computer with a mobile terminal, such as a portable, pocket-sized, handheld, computer built-in, or in-vehicle mobile apparatus.

Further, the magnetic medium 10 is configured to be magnetized by a first magnetic field generated by an electronic component, and be connected to the electronic component under an effect of a magnetic force of the first magnetic field when the electronic device detects connection of the electronic component, where the electronic component accommodates or is connected to a target connection component.

The magnetic medium 10 refers to a material in which a magnetization state changes under an effect of a magnetic field. Preferably, the magnetic medium 10 in the embodiment of the present disclosure may be an iron core. The iron core may be made of a soft iron or silicon steel material, which is not limited by the embodiment of the present disclosure. In addition, a shape characteristic of the magnetic medium 10 may be a cuboid, or may be a cylinder. The shape characteristic of the magnetic medium is not limited by the embodiment of the present disclosure.

In addition, the electronic component in the embodiment of the present disclosure may be a permanent magnet apparatus, or may be another apparatus with a permanent magnet characteristic. The electronic component includes an electronic interface. The electronic interface is connected to or accommodates a target connection component, and the electronic component can generate a first magnetic field.

Further, when the electronic component is being connected to the body of the electronic device, a distance between the electronic component and the magnetic medium 10 is becoming shorter, and the magnetic medium 10 is magnetized by the first magnetic field. A change of an internal state of the magnetic medium 10 under an effect of the magnetic field is referred to as magnetization. That is, the internal state of the magnetic medium 10 changes under the effect of the first magnetic field. In addition, under the effect of the magnetic force of the first magnetic field, the magnetic medium 10 mutually attracts and is connected to the electronic component.

For example, the magnetic medium 10 in the electronic device is an iron core. The electronic component is a permanent magnet that includes an electronic interface, and therefore, when the permanent magnet is connected to the body of the electronic device, the iron core is magnetized by a magnetic field generated by the permanent magnet, and is connected to the permanent magnet.

Further, under the effect of the first magnetic field, the coil 11 is configured to generate a first electric signal according to a change of a magnetic flux in the coil 11, where the first electric signal is used to drive the processor 12 to determine whether identification information of the target connection component accommodated in or connected to the electronic component is the same as a preset identifier.

The magnetic flux is a measure of magnitude of a magnetic field that passes through a given curved surface. Magnitude of a magnetic flux that passes through a plane may be figuratively depicted by a quantity of magnetic induction lines in the plane. In a same magnetic field, magnetic induction lines are denser in a place with a higher magnetic induction intensity.

Understandably, that the coil 11 encircles the side of the magnetic medium 10 includes a case in which the coil 11 encircles all sides of the magnetic medium 10. For example, if a shape of the magnetic medium 10 is a cylinder that includes two bases and a curved surface, the coil 11 may encircle the curved surface (side) of the cylinder, or may encircle the bases of the cylinder, or may encircle the curved surface and the bases of the cylinder. A manner of encircling the magnetic medium 10 by the coil 11 should meet an encircling manner of the coil 11 in practical application, and is not limited by the embodiment of the present disclosure.

When the electronic component is being connected to the electronic device, the electronic component is becoming closer to the magnetic medium 10 under the effect of the magnetic force of the first magnetic field, and the magnetic flux of the first magnetic field in the coil 11 changes, where the first magnetic field is generated by the electronic component. From electromagnetic induction principles, it can be learned that a conductor in a changing magnetic flux may generate an electromotive force. That is, as the magnetic flux of the first magnetic field in the coil 11 changes, the coil 11 generates a first electric signal, and the first electric signal also changes with the magnetic flux.

It should be noted that the first electric signal in the embodiment of the present disclosure may be a current or a voltage, which is not limited by the embodiment of the present disclosure.

Further, the processor 12 is configured to detect the change of the magnetic flux, and is configured to determine whether the identification information of the target connection component is the same as the preset identifier if a change of the first electric signal meets a first preset model.

The processor 12 is further configured to drive the electronic component to be disconnected from the electronic device if the identification information of the target connection component is different from the preset identifier.

The target connection component in the embodiment of the present disclosure may be a data card, may be a memory card, or may be a chip in another intelligent electronic component, which is not limited by the embodiment of the present disclosure. The target connection component is a component used by the electronic device for communication or data transmission.

For example, the target connection component is an SD card, a SIM card, a multimedia card (MMC), a mini SD card, a memory stick, a smart card, a micro SD card, or the like in the electronic device. The identification information of the target connection component may be a serial number of the target connection component, or may be an ID of the target connection component, which is not limited by the embodiment of the present disclosure.

In addition, the electronic component in the embodiment of the present disclosure accommodates or is connected to the target connection component using an electronic interface. There is at least one target connection component, such as two or more than two, which is not limited by the embodiment of the present disclosure.

Preferably, the electronic interface of the electronic component is a slot. In this case, the target connection component is a data card (or a memory card), and therefore, the data card (or the memory card) may be disposed at a groove of the slot, and a size of the groove may fit a size of the data card (memory card).

Further, no matter how many target connection components are included in the electronic component, processing that may be performed by the processor 12 on the target connection components are the same processing, and the processor 12 determines whether identification information of a target connection component is the same as a preset identifier, where the preset identifier is an identifier corresponding to the target connection component. So long as determining that the identifier of the target connection component is different from the preset identifier, the processor 12 drives the electronic component to be disconnected from the electronic device.

For example, if the electronic device is a mobile phone on which no SIM card is installed and the electronic component is a slot with a permanent magnet characteristic, the slot can accommodate a SIM card. Identification information of the SIM card is an international mobile subscriber identity (IMSI).

Optionally, in an application scenario in which the mobile phone has only one slot port and the slot with a permanent magnet characteristic can accommodate only one SIM card, the processor in the mobile phone determines whether an IMSI of the SIM card accommodated in the slot is the same as a preset identifier. The processor drives the slot to be disconnected from the mobile phone, namely, the SIM accommodated in the slot cannot be used normally if the IMSI of the SIM card is different from the preset identifier.

Optionally, in an application scenario in which the mobile phone includes two slot ports, the slot with a permanent magnet characteristic can accommodate only one SIM card, and the mobile phone has two slots for accommodating a SIM card A and a SIM card B respectively, the processor in the mobile phone processes the two slots in the same way as the foregoing application scenario. The SIM card A can be used normally in the mobile phone when the processor in the mobile phone determines that an IMSI of the SIM card A is the same as a preset identifier thereof. The processor drives the slot, which accommodates the SIM card B, to be disconnected from the mobile phone, namely, the SIM card B cannot be used normally in the mobile phone when the processor in the mobile phone determines that an IMSI of the SIM card B is different from a preset identifier thereof.

Optionally, in an application scenario in which the mobile phone includes one slot port and the slot with a permanent magnet characteristic can accommodate at least one SIM card, for example, the slot accommodates two SIM cards, the processor in the mobile phone separately determines whether IMSIs of the two SIM cards are the same as preset identifiers of the SIM cards. In a first possible implementation manner, both the SIMs can be used normally in the mobile phone. In a second possible implementation manner if the IMSIs of both the SIM cards are the same as the preset identifiers, the processor in the mobile phone drives this slot to be disconnected from the mobile phone such that neither of the SIM cards accommodated in the slot can be used normally if the IMSI of one of the SIM cards is different from a preset identifier thereof. In a third possible implementation manner, the mobile phone may keep a state of connection between this slot and the mobile phone, and disables the SIM card whose IMSI is different from the preset identifier if the IMSI of one of the SIM cards is different from a preset identifier thereof. That is, one of the SIM cards can be used normally, and the other SIM card cannot be used normally.

Further, the processor 12 is further configured to generate a first control signal if the identification information is the same as the preset identifier.

The coil 11 is further configured to generate a second electric signal according to the first control signal, and generate a second magnetic field using the second electric signal, where a magnetic force of the second magnetic field is used to drive the electronic component to be fixedly connected to the electronic device.

Further, if the processor 12 determines that the identification information of the target connection component is the same as the preset identifier, it indicates that the target connection component can be used normally in the electronic device. Correspondingly, the processor 12 generates a first control signal, which is used to drive the coil 11 to generate a second electric signal. Correspondingly, a second magnetic field may be generated using the second electric signal generated by the coil 11. A magnetic force of the second magnetic field is used to drive the electronic component to be fixedly connected to the electronic device, namely, drive the electronic component to be more closely connected to the electronic device, which is equivalent to a lock-in state between the electronic component and the electronic device, thereby preventing a communications fault problem caused by a loose connection between the electronic component and the electronic device, and further improving usage security of the electronic device.

It should be noted that the second electric signal in the embodiment of the present disclosure may be a current or a voltage, which is not limited by the embodiment of the present disclosure.

The magnetic force of the second magnetic field generated using the second electric signal is used to drive the electronic component to be fixedly connected to the electronic device, the first electric signal is generated according to the change of the magnetic flux of the first magnetic field, and the magnetic force of the first magnetic field is also used to drive the electronic component to be connected to the electronic device. From the Lenz's law, it can be learned that the first electric signal and the second electric signal have a same direction.

The processor 12 is further configured to obtain instruction information, where the instruction information is used to drive the electronic component to be disconnected from the electronic device.

Preferably, the instruction information is information entered by a user using an application on the electronic device, and the instruction information is used to drive the electronic component to be disconnected from the electronic device, and may be a secure digital password, or may be other related information such as a graphical password.

The application refers to a computer program that is developed to complete one or more specific tasks and runs on an operating system. The application in the embodiment of the present disclosure is an application compatible with a system running on the electronic device.

It should be noted that the system running on the electronic device may be an ANDROID operating system, or may be another system such as an IOS, which is not limited by the embodiment of the present disclosure. Because the system running on the electronic device may be an ANDROID operating system, or may be another system, a format of the application also changes with the system.

For example, if the system running on the electronic device is an ANDROID operating system, the application is an application package file (APK).

The APK is an application installation file format on an ANDROID operating system. Before being run on an ANDROID device, code of an ANDROID application needs to be compiled first, and then packed into a file identifiable by the ANDROID operating system. This file format that can be identified and run by the ANDROID operating system is APK. An APK file includes a compiled code file (.dex file), file resources (resources), file access (assets), certificates, and a manifest file.

For example, if the electronic device is a smartphone on which a SIM card is installed, an application A is installed on the smartphone, and secure digital password input is set in the application A, when a user uses the application A to enter a digital password that drives ejection of the SIM card slot of the mobile phone, the processor in the mobile phone obtains the digital password entered by the user.

The processor 12 is further configured to drive the electronic component to be disconnected from the electronic device after obtaining the instruction information.

The processor 12 is further configured to determine whether the instruction information is the same as instruction verification information after obtaining the instruction information.

The processor 12 is further configured to drive the electronic component to be disconnected from the electronic device if the instruction information is the same as the instruction verification information.

Further, after obtaining the instruction information, the processor 12 performs determining on the instruction information, and determines whether the instruction information is the same as preset instruction verification information, and drives the electronic component to be disconnected from the electronic device if the instruction information is the same as the preset instruction verification information.

For example, if the electronic device is a smartphone on which a SIM card is installed, an application A is installed on the smartphone, and secure digital password input is set in the application A, when a user uses the application A to enter a digital password that drives ejection of the SIM card slot of the mobile phone, the processor in the mobile phone obtains the digital password entered by the user. The processor drives the slot to be disconnected from the smartphone, namely, drives ejection of the slot out of the smartphone when the digital password entered by the user is the same as a preset digital password.

The processor 12 is further configured to generate a second control signal if the identification information is different from the preset identifier.

Further, if the identification information is different from the preset identifier or if the instruction information is the same as the instruction verification information, the processor 12 generates a second control signal, and the electronic component is disconnected from the electronic device under an effect of the second control signal.

In this application scenario, compared with a disadvantage in other approaches that leakage of information in an electronic device may be caused by a fact that a user can change a card in the electronic device by only triggering a mechanical lever, the electronic device in the embodiment of the present disclosure can complete disconnection only after receiving the instruction information that is entered by the user and used to drive the electronic device to be disconnected from the electronic component and after identifying the instruction information successfully such that the user can change the target connection component accommodated in or connected to the electronic component, thereby better protecting security of the information in the electronic device.

The coil 11 is further configured to generate a third electric signal according to the second control signal, and generate the second magnetic field using the third electric signal, where the magnetic force of the second magnetic field is used to drive the electronic component to be disconnected from the electronic device.

The processor 12 is further configured to detect whether a change of the third electric signal meets a second preset model, and drive the coil 11 to stop generating the third electric signal if the change of the third electric signal meets the second preset model.

Further, in order to verify whether the electronic component is already disconnected from the electronic device or detect whether a distance between the electronic component and the electronic device already meets requirements, the processor 12 in the electronic device needs to detect whether the change of the third electric signal meets the second preset model, and drives the coil 11 to stop generating the third electric signal if the change of the third electric signal meets the second preset model, thereby avoiding a problem of large power consumption of the electronic device.

It should be noted that the second preset model in the embodiment of the present disclosure may be a coordinates diagram of the change of the third electric signal, or may be a line graph of a change rate of the third electric signal, which is not limited by the embodiment of the present disclosure.

Further, the target connection component is a data card or a memory card, and the identification information of the target connection component is a serial number or an ID of the target connection component.

This embodiment of the present disclosure provides an electronic device. The electronic device detects a change of a magnetic flux of a first magnetic field in the electronic device, and generates a first electric signal according to the change of the magnetic flux, where the first magnetic field is generated by an electronic component, a magnetic force of the first magnetic field is used to drive the electronic component to be connected to the electronic device, and the electronic component accommodates or is connected to a target connection component. From electromagnetic induction principles, it can be learned that the change of the magnetic flux of the first magnetic field in the electronic device may cause the electronic device to generate a first electric signal, where the first magnetic field is generated by the electronic component, and the change of the magnetic flux may cause a change of the first electric signal. The electronic device determines whether identification information of the target connection component is the same as a preset identifier if the change of the first electric signal meets a first preset model, and the electronic device drives the electronic component to be disconnected from the electronic device if the identification information of the target connection component is different from the preset identifier.

Using this solution, the electronic device completes, by means of program logic control, determining whether the target connection component accommodated in or connected to the electronic component has been authorized, namely, determining whether the identification information of the target connection component is the same as the preset identifier, the electronic device drives the electronic component to be disconnected from the electronic device if the target connection component is not authorized. In this way, it is ensured that an unauthorized target connection component cannot be normally used after the target connection component is connected to the electronic device, thereby improving security of the electronic device.

Embodiment 2

Figure 2:
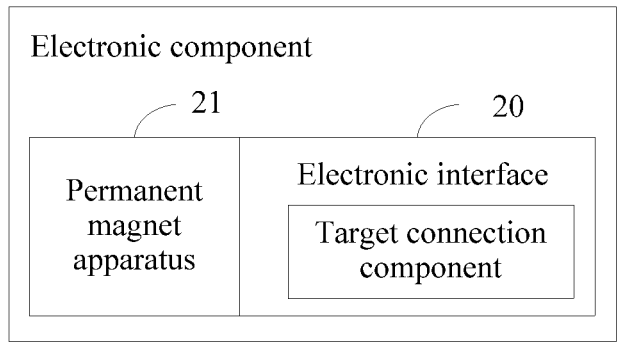
FIG. 2 is a schematic structural diagram of an electronic component according to an embodiment of the present disclosure.

As shown in FIG. 2, this embodiment of the present disclosure provides an electronic component, which may include a permanent magnet apparatus 21 that includes an electronic interface 20, where the electronic interface 20 is physically connected to the permanent magnet apparatus 21.

The permanent magnet apparatus 21 is configured to generate a first magnetic field, where a magnetic force of the first magnetic field is used to drive the electronic component to be connected to an electronic device when the electronic component is being connected to the electronic device.

The permanent magnet apparatus 21 in the embodiment of the present disclosure may be a permanent magnet, or may be another apparatus with a permanent magnet characteristic, which is not limited by the embodiment of the present disclosure.

The permanent magnet apparatus 21 in the embodiment of the present disclosure uses a material that can keep constant magnetism once magnetized, and that may be an alloy permanent magnet material, or may be a ferrite permanent magnet material, which is not limited by the embodiment of the present disclosure. In addition, a shape characteristic of the permanent magnet apparatus 21 is not limited by the embodiment of the present disclosure, and the shape may be a cylinder, or may be a cuboid.

Because the permanent magnet apparatus 21 in the embodiment of the present disclosure has performance of a permanent magnet, an electron layout in the permanent magnet apparatus 21 takes on a specific direction, and is reflected by regular molecular currents to the outside such that a first magnetic field is generated.

Further, the electronic interface 20 is configured to accommodate or be connected to a target connection component, where the target connection component is used by the electronic device to perform communication or used to perform data transmission with the electronic device.

The target connection component in the embodiment of the present disclosure may be a data card, may be a memory card, or may be a chip in another intelligent electronic component, which is not limited by the embodiment of the present disclosure. The target connection component is a component used by the electronic device for communication or data transmission.

For example, the target connection component is an SD card, a SIM card, an MMC, a mini SD card, a memory stick, a smart card, a micro SD card, or the like in the electronic device.

It should be noted that the electronic interface 20 in the embodiment of the present disclosure may accommodate or be connected to at least one target connection component.

Preferably, the electronic interface 20 is a slot, and the slot is rigidly connected to the permanent magnet apparatus 21.

The rigid connection means that between two connected components, when one component generates a shift or is under a force, the other component connected to it does not generate any shift or does not deform relatively as against this component. For example, the two connected components are connected into a whole by means of mechanical connection such as welding and bolt connection.

For example, the slot may accommodate one or more SIM cards if the electronic interface is a slot and the target connection component is a SIM card.

The embodiment of the present disclosure provides an electronic component, and the electronic component includes a permanent magnet apparatus that includes an electronic interface, and the permanent magnet apparatus is configured to generate a first magnetic field, where a magnetic force of the first magnetic field is used to drive the electronic component to be connected to the electronic device when the electronic component is being connected to the electronic device. According to this solution, the electronic component includes the permanent magnet apparatus, and the permanent magnet apparatus can implement connection/disconnection between the electronic component and the electronic device by means of a magnetic force.

Embodiment 3

Figure 3:
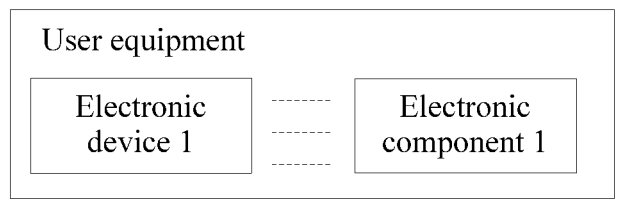
FIG. 3 is a schematic structural diagram of user equipment according to an embodiment of the present disclosure.

As shown in FIG. 3, this embodiment of the present disclosure provides user equipment, which includes at least an electronic device 1 and an electronic component 1. Electromagnetic induction (represented by dashed lines in FIG. 3) exists between the electronic device 1 and the electronic component when the electronic component 1 is connected to the electronic device 1.

The electronic device 1 includes an electronic device with any characteristic described in Embodiment 1, and the electronic component 1 includes an electronic component with any characteristic described in Embodiment 2.

The embodiment of the present disclosure provides user equipment, and the user equipment includes at least an electronic device 1 and an electronic component 1. Further, the electronic device 1 detects a change of a magnetic flux of a first magnetic field in the electronic device 1, where the first magnetic field is generated by the electronic component 1, and generates a first electric signal according to the change of the magnetic flux, where a magnetic force of the first magnetic field is used to drive the electronic component 1 to be connected to the electronic device 1, and the electronic component 1 accommodates or is connected to a target connection component. From electromagnetic induction principles, it can be learned that the change of the magnetic flux of the first magnetic field in the electronic device 1 may cause the electronic device 1 to generate a first electric signal, where the first magnetic field is generated by the electronic component 1, and the change of the magnetic flux may cause a change of the first electric signal. The electronic device 1 determines whether identification information of the target connection component is the same as a preset identifier if the change of the first electric signal meets a first preset model, and the electronic device 1 drives the electronic component 1 to be disconnected from the electronic device 1 if the identification information of the target connection component is different from the preset identifier.

Using this solution, the electronic device 1 completes, by means of program logic control, determining whether the target connection component accommodated in or connected to the electronic component 1 has been authorized, namely, determining whether the identification information of the target connection component is the same as the preset identifier, the electronic device 1 drives the electronic component 1 to be disconnected from the electronic device 1 if the target connection component is not authorized. In this way, it is ensured that an unauthorized target connection component cannot be normally used after the target connection component is connected to the electronic device 1, thereby improving security of the electronic device 1.

Embodiment 4

Figure 4:
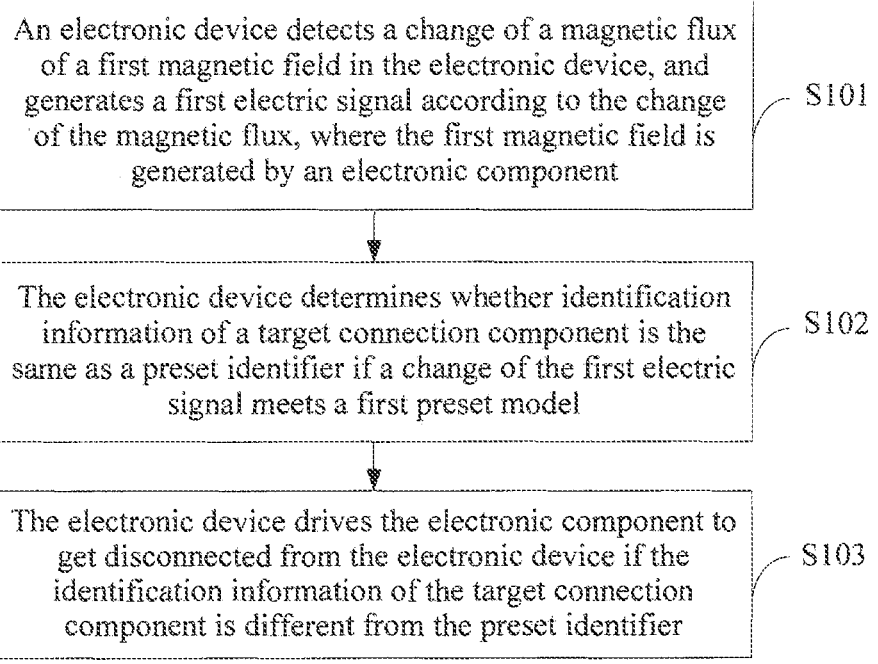
FIG. 4 is a schematic flowchart of a connection/disconnection method according to an embodiment of the present disclosure.

This embodiment of the present disclosure provides a connection/disconnection method. As shown in FIG. 4, the disconnection method includes the following steps.

Step S101: An electronic device detects a change of a magnetic flux of a first magnetic field in the electronic device, and generates a first electric signal according to the change of the magnetic flux, where the first magnetic field is generated by an electronic component.

A magnetic force of the first magnetic field is used to drive the electronic component to be connected to the electronic device, and the electronic component accommodates or is connected to a target connection component.

The electronic device in the embodiment of the present disclosure may be any apparatus that includes a user interface, which is not limited by the embodiment of the present disclosure. For example, the electronic device may be a mobile phone on which no SIM card slot is installed, may be a mobile phone to which no headset is connected, or may be an electronic device without an anti-theft lock on an electronic exhibition booth.

The electronic device may be a mobile phone (or referred to as a "cellular" phone), or may be a computer with a mobile terminal, such as a portable, pocket-sized, handheld, computer built-in, or in-vehicle mobile apparatus.

The electronic component in the embodiment of the present disclosure may be a permanent magnet apparatus, or may be another apparatus with a permanent magnet characteristic. The electronic component includes an electronic interface. The electronic interface is connected to or accommodates a target connection component, and the electronic component can generate a first magnetic field. A magnetic force of the first magnetic field is used to drive the electronic component to be connected to the electronic device when the electronic component is being connected to the electronic device.

Further, because an electron layout inside the permanent magnet apparatus in the embodiment of the present disclosure takes on a specific direction, and is reflected by regular molecular currents to the outside such that a first magnetic field is generated. The permanent magnet apparatus has performance of a permanent magnet, and uses a material that can keep constant magnetism once magnetized, and that may be an alloy permanent magnet material, or may be a ferrite permanent magnet material, which is not limited by the embodiment of the present disclosure. In addition, a shape characteristic of the permanent magnet apparatus is not limited by the embodiment of the present disclosure, and the shape may be a cylinder, or may be a cuboid.

It should be noted that distribution locations of poles of the first magnetic field generated by the electronic component in the embodiment of the present disclosure are not limited by the embodiment of the present disclosure. Optionally, one end that is of the electronic component and disposed opposite the electronic device is a north (N) pole, and the other end is a south (S) pole, or, one end disposed opposite the electronic device is a south (S) pole, and the other end is a north (N) pole.

Further, the electronic device can detect the change of the magnetic flux of the first magnetic field in the electronic device, and generates a first electric signal according to the change of the magnetic flux when the electronic component is being connected to the electronic device.

The magnetic flux is a measure of magnitude of a magnetic field that passes through a given curved surface. Magnitude of a magnetic flux that passes through a plane may be figuratively depicted by a quantity of magnetic induction lines in the plane. In a same magnetic field, magnetic induction lines are denser in a place with a higher magnetic induction intensity. When the electronic component is being connected to the electronic device, the electronic component is becoming closer to the electronic device under an effect of the magnetic force of the first magnetic field, and the magnetic flux of the first magnetic field in the electronic device changes, where the first magnetic field is generated by the electronic component. From electromagnetic induction principles, it can be learned that a conductor in a changing magnetic flux may generate an electromotive force. That is, as the magnetic flux of the first magnetic field in the electronic device changes, the electronic device generates a first electric signal, and the first electric signal also changes with the magnetic flux.

Further, the electronic device in the embodiment of the present disclosure includes a magnetic medium, a coil that encircles a side of the magnetic medium, and a processor.

The magnetic medium refers to a material in which a magnetization state changes under an effect of a magnetic field. The magnetic medium in the embodiment of the present disclosure may be an iron core. The iron core may use a soft iron or silicon steel material, which is not limited by the embodiment of the present disclosure.

Further, when the electronic component is being connected to the electronic device, the magnetic medium is magnetized by the first magnetic field under the effect of the first magnetic field, and is connected to the electronic component under the effect of the magnetic force of the first magnetic field.

Figure 5:
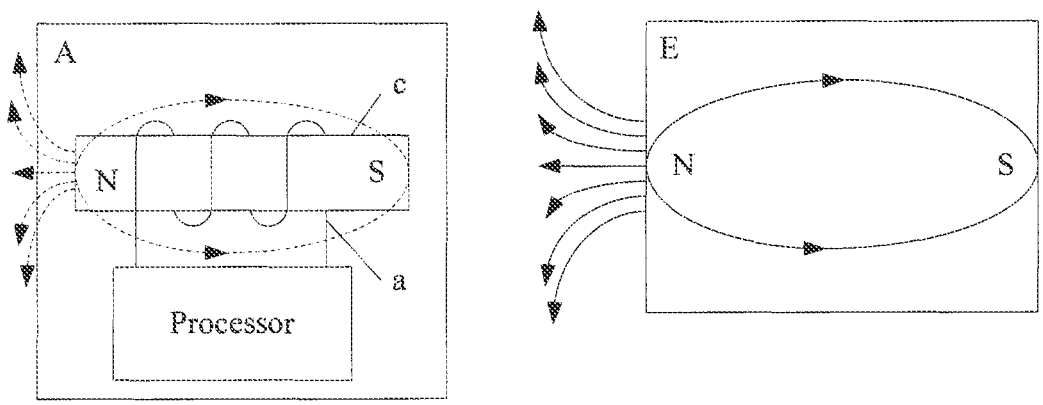
FIG. 5 is a schematic diagram of magnetizing a magnetic medium of an electronic device according to an embodiment of the present disclosure.

For example, as shown in FIG. 5, a permanent magnet apparatus in an electronic component is of a cuboid shape, the left end of the permanent magnet apparatus is a north pole (N pole), and the right end is a south pole (S) pole. In FIG. 5, E represents the permanent magnet apparatus. Distribution of a first magnetic field generated by the permanent magnet apparatus is represented by arrowed solid lines in FIG. 5, A represents an electronic device, c represents a magnetic medium, and a represents a coil. When the permanent magnet apparatus approaches the electronic device, the magnetic medium c is magnetized by the first magnetic field generated by the permanent magnet apparatus E. In this case, the pole (namely, the right end of the magnetic medium) disposed opposite the permanent magnet module in the magnetic medium c is the S pole. Under an effect of a magnetic force of the first magnetic field, the magnetic medium is connected to the permanent magnet apparatus.

Further, as a distance between the magnetic medium and the permanent magnet apparatus changes, the magnetic flux of the first magnetic field in the coil also changes accordingly. From electromagnetic induction principles, it can be learned that a conductor in a changing magnetic flux may generate an electromotive force. That is, as the magnetic flux in the coil changes, the coil generates a first electric signal.

The first electric signal may be a current or a voltage, which is not limited by the embodiment of the present disclosure. Further, a direction of the current or a positive or negative pole of the voltage may be determined according to the Lenz's law.

Figure 6:
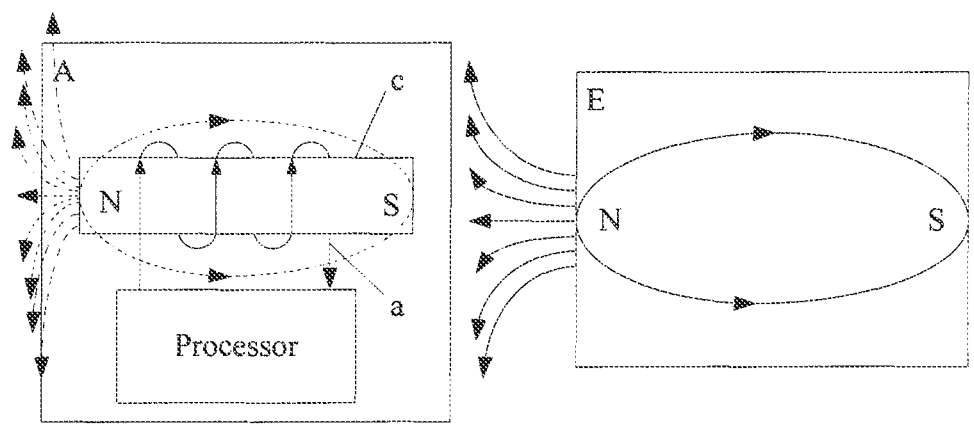
FIG. 6 is a schematic diagram of generating a first electric signal by an electronic device according to an embodiment of the present disclosure.

For example, as shown in FIG. 6, the left end of a permanent magnet apparatus E is an N pole, and the right end is an S pole. Distribution of a first magnetic field generated by the permanent magnet apparatus is represented by arrowed solid lines in FIG. 6, A represents an electronic device, c represents a magnetic medium, and a represents a coil. When the permanent magnet apparatus E approaches the electronic device A, the magnetic medium c is magnetized, and the right end of the magnetic medium is the S pole. As a distance between the permanent magnet apparatus E and the electronic device A changes, a magnetic flux of the first magnetic field in the coil a changes. The changed magnetic flux triggers the coil a to generate a first electric signal. In FIG. 6, arrowed dashed lines represent the first magnetic field in the coil, and a current represents the first electric signal. From the Lenz's law, it can be learned that a direction of the current is the direction indicated on the coil in FIG. 6.

Step S102: The electronic device determines whether identification information of a target connection component is the same as a preset identifier if a change of the first electric signal meets a first preset model.

The first electric signal generated by the electronic device changes with the magnetic flux. The electronic device determines whether the identification information of the target connection component is the same as the preset identifier when the change of the first electric signal meets the first preset model.

The target connection component in the embodiment of the present disclosure may be a data card, may be a memory card, or may be a chip in another intelligent electronic component, which is not limited by the embodiment of the present disclosure. The target connection component is a component used by the electronic device for communication or data transmission.

For example, the target connection component is an SD card, a SIM card, an MMC, a mini SD card, a memory stick, a smart card, a micro SD card, or the like in the electronic device. The identification information of the target connection component may be a serial number of the target connection component, or may be an ID of the target connection component, which is not limited by the embodiment of the present disclosure.

In addition, the electronic component in the embodiment of the present disclosure accommodates or is connected to the target connection component using an electronic interface. There is at least one target connection component, such as two or more than two, which is not further limited by the embodiment of the present disclosure.

Preferably, the electronic interface of the electronic component is a slot. In this case, the target connection component is a data card (or a memory card), and therefore, the data card (or the memory card) may be disposed at a groove of the slot, and a size of the groove may fit a size of the data card (memory card).

Further, no matter how many target connection components are included in the electronic component, processing that may be performed by the electronic device on the target connection components are the same processing, and the electronic device determines whether identification information of a target connection component is the same as a preset identifier, where the preset identifier is an identifier corresponding to the target connection component.

It may be understood that when the distance between the electronic device and the electronic component is becoming shorter, the change of the magnetic flux of the first magnetic field in the electronic device may increase from zero to a maximum value, and then decrease from the maximum value to zero. As the magnetic flux changes, the change of the first electric signal may also take on a specific change trend. When the change trend of the first electric signal meets the first preset model, it indicates that the electronic component is fully connected to the electronic device.

It should be noted that the first preset model in the embodiment of the present disclosure may be a coordinates diagram of the change of the first electric signal, or may be a line graph of a change rate of the first electric signal, which is not limited by the embodiment of the present disclosure.

Further, the electronic device reads the identification information of the target connection component, and then compares the read identification information with a pre-stored preset identifier if the change of the first electric signal meets the first preset model. If the read identification information is the same as the preset identifier, it indicates that the target connection component is an authorized target connection component, conversely, it indicates that the target connection component is not authorized.

For example, if the electronic device is a mobile phone on which no SIM card is installed, the electronic component is a slot with a permanent magnet characteristic, and the slot can accommodate a SIM card, the mobile phone may read and detect an IMSI in the SIM card. If a pre-stored first preset IMSI is 460030912121001 and the IMSI of the SIM card accommodated in the slot that is connected to the mobile phone is 460030912121012, the mobile phone compares the read IMSI with the pre-stored first preset IMSI after reading the IMSI 460030912121012 of the SIM card. 460030912121012 is different from 460030912121001, and therefore, the SIM cannot be normally used by the connected mobile phone, namely, is an unauthorized card.

The electronic device keeps connected to the electronic component if the identification information of the target connection component is the same as the preset identifier, and the electronic device performs step S103 if the identification information of the target connection component is different from the preset identifier.

Step S103: The electronic device drives the electronic component to be disconnected from the electronic device if the identification information of the target connection component is different from the preset identifier.

Further, if the electronic device determines that the identification information of the target connection component is different from the preset identifier, it indicates that the target connection component is an unauthorized or invalid target connection component, and therefore, the processor in the electronic device generates a second control signal. Under an effect of the second control signal, the electronic device is disconnected from the electronic component, thereby avoiding that an unauthorized target connection component is connected to the electronic device and is used normally, and ensuring security of the electronic device.

Further, the coil generates a third electric signal according to the second control signal, and generates a second magnetic field using the third electric signal, where a magnetic force of the second magnetic field is used to drive the electronic component to be disconnected from the electronic device.

The third electric signal may be a current or a voltage, which is not limited by the embodiment of the present disclosure. Further, a direction of the current or a positive or negative pole of the voltage may be determined according to the Lenz's law.

It may be understood that because the magnetic force of the second magnetic field is used to drive the electronic component to be disconnected from the electronic device, according to same-pole repelling in a magnetic field, it can be learned that pole distribution of the second magnetic field is as follows. Poles that are of the electronic component and disposed opposite the electronic device have same magnetism.

Figure 7:
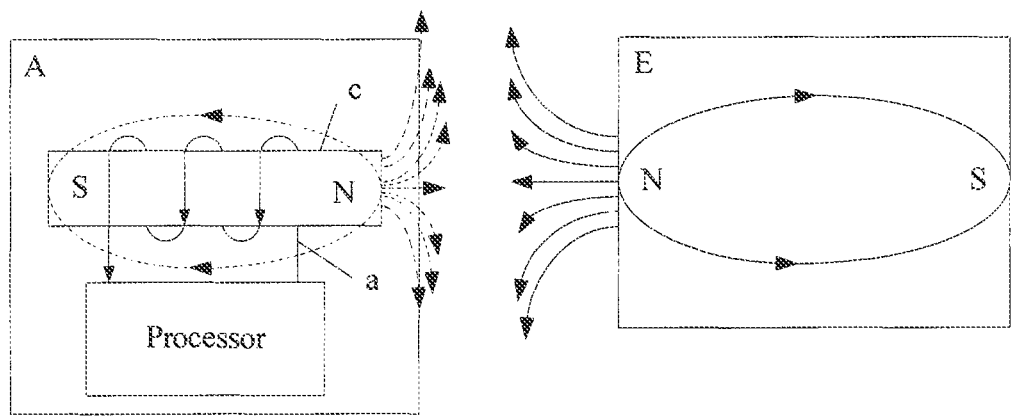
FIG. 7 is a schematic diagram of generating a second magnetic field by an electronic device according to an embodiment of the present disclosure.

For example, as shown in FIG. 7, pole distribution of a permanent magnet apparatus is that the left end is an N pole, and the right end is an S pole. In FIG. 7, E represents the permanent magnet apparatus. Distribution of a first magnetic field is represented by arrowed solid lines, A represents an electronic device, c represents a magnetic medium, and a represents a coil. After generating a second control signal, a processor drives the coil to generate a third electric signal. In FIG. 7, a current is used to represent the third electric signal, and a direction of the current is the direction indicated on the coil in FIG. 7. From a phenomenon that a current generates a magnetic field, it can be learned that after the coil generates the third electric signal, a second magnetic field may be generated around the coil. According to the Lenz's law, it can be determined that poles of the second magnetic field are as follows. The right end is an N pole, and the left end is an S pole. Distribution of the second magnetic field is represented by arrowed dashed lines in FIG. 7. Because the right end of the second magnetic field is the N pole and the left end of the first magnetic field is the N pole, the electronic component is disconnected from the electronic device under an effect of a magnetic force.

Further, in order to determine whether the electronic component is fully disconnected from the electronic device, the electronic device further needs to detect whether a change of the third electric signal in the coil meets a second preset model, and the electronic device drives the coil to stop generating the third electric signal if the change of the second electric signal meets the second preset model.

The second preset model in the embodiment of the present disclosure may be a coordinates diagram of the change of the third electric signal, or may be a line graph of a change rate of the third electric signal, which is not limited by the embodiment of the present disclosure.

This embodiment of the present disclosure provides a connection/disconnection method. An electronic device detects a change of a magnetic flux of a first magnetic field in the electronic device, and generates a first electric signal according to the change of the magnetic flux, where the first magnetic field is generated by an electronic component, a magnetic force of the first magnetic field is used to drive the electronic component to be connected to the electronic device, and the electronic component accommodates or is connected to a target connection component. From electromagnetic induction principles, it can be learned that the change of the magnetic flux of the first magnetic field in the electronic device may cause the electronic device to generate a first electric signal, where the first magnetic field is generated by the electronic component, and the change of the magnetic flux may cause a change of the first electric signal. The electronic device determines whether identification information of the target connection component is the same as a preset identifier if the change of the first electric signal meets a first preset model, and the electronic device drives the electronic component to be disconnected from the electronic device if the identification information of the target connection component is different from the preset identifier.

Using this solution, the electronic device completes, by means of program logic control, determining whether the target connection component accommodated in or connected to the electronic component has been authorized, namely, determining whether the identification information of the target connection component is the same as the preset identifier, and the electronic device drives the electronic component to be disconnected from the electronic device if the target connection component is not authorized. In this way, it is ensured that an unauthorized target connection component cannot be normally used after the target connection component is connected to the electronic device, thereby improving security of the electronic device.

Embodiment 5

Figure 8:
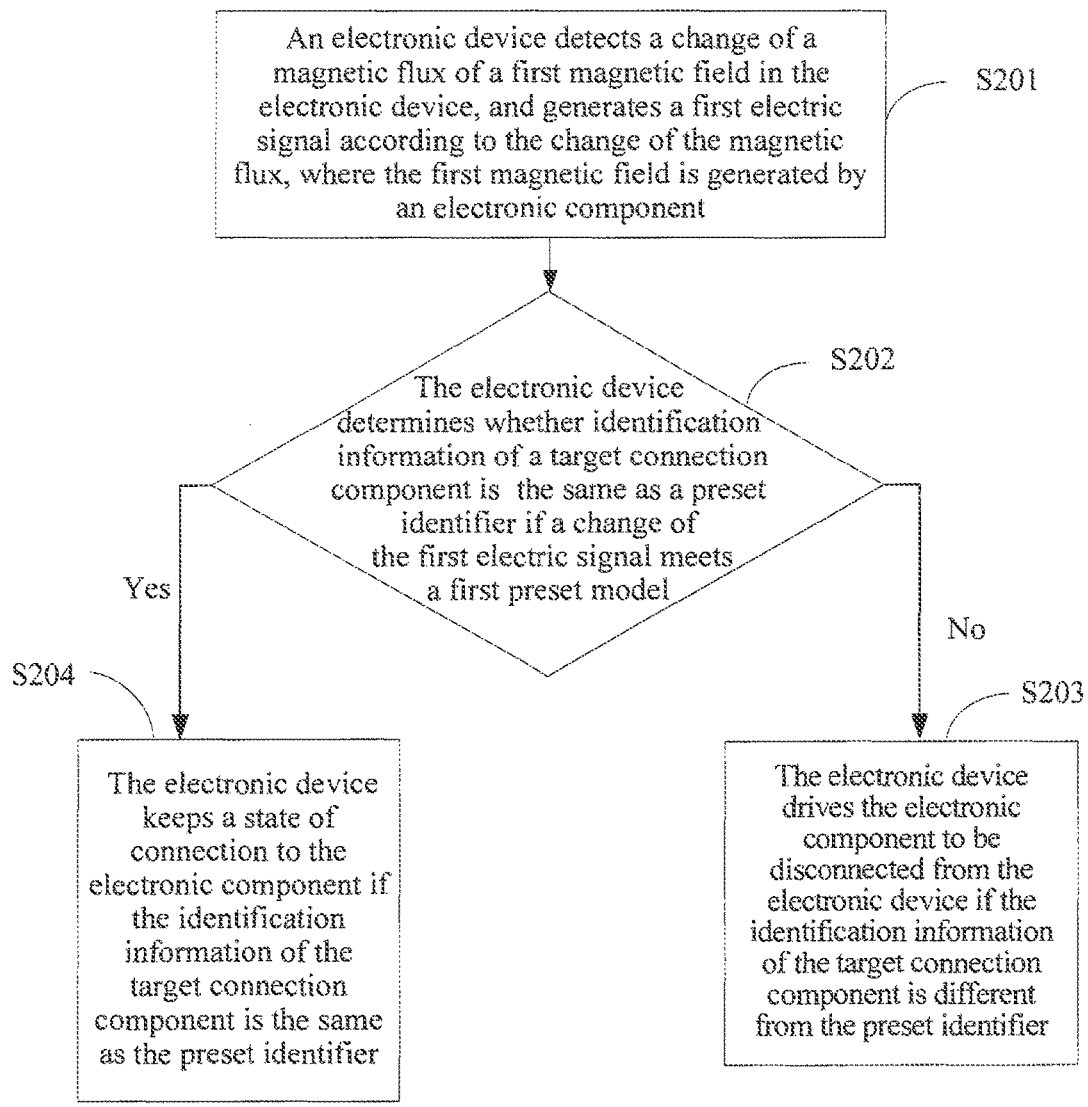
FIG. 8 is a schematic flowchart of a connection/disconnection method according to an embodiment of the present disclosure.

This embodiment of the present disclosure provides a connection/disconnection method. As shown in FIG. 8, the connection/disconnection method includes the following steps.

Step S201: An electronic device detects a change of a magnetic flux of a first magnetic field in the electronic device, and generates a first electric signal according to the change of the magnetic flux, where the first magnetic field is generated by an electronic component.

A magnetic force of the first magnetic field is used to drive the electronic component to be connected to the electronic device, and the electronic component accommodates or is connected to a target connection component.

The electronic device in the embodiment of the present disclosure may be any apparatus that includes a user interface, which is not limited by the embodiment of the present disclosure. For example, the electronic device may be a mobile phone on which no SIM card slot is installed, may be a mobile phone to which no headset is connected, or may be an electronic device without an anti-theft lock on an electronic exhibition booth.

The electronic device may be a mobile phone (or referred to as a "cellular" phone), or may be a computer with a mobile terminal, such as a portable, pocket-sized, handheld, computer built-in, or in-vehicle mobile apparatus.

The electronic component in the embodiment of the present disclosure may be a permanent magnet apparatus, or may be another apparatus with a permanent magnet characteristic. The electronic component includes an electronic interface. The electronic interface is connected to or accommodates a target connection component, and the electronic component can generate a first magnetic field. A magnetic force of the first magnetic field is used to drive the electronic component to be connected to the electronic device when the electronic component is being connected to the electronic device.

Further, because an electron layout inside the permanent magnet apparatus in the embodiment of the present disclosure takes on a specific direction, and is reflected by regular molecular currents to the outside such that a first magnetic field is generated. The permanent magnet apparatus has performance of a permanent magnet, and uses a material that can keep constant magnetism once magnetized, and that may be an alloy permanent magnet material, or may be a ferrite permanent magnet material, which is not limited by the embodiment of the present disclosure. In addition, a shape characteristic of the permanent magnet apparatus is not limited by the embodiment of the present disclosure, and the shape may be a cylinder, or may be a cuboid.

It should be noted that distribution locations of poles of the first magnetic field generated by the electronic component in the embodiment of the present disclosure are not limited by the embodiment of the present disclosure. Optionally, one end that is of the electronic component and disposed opposite the electronic device is an N pole, and the other end is an S pole, or, one end disposed opposite the electronic device is an S pole, and the other end is an N pole.

Further, the electronic device can detect the change of the magnetic flux of the first magnetic field in the electronic device, and generates a first electric signal according to the change of the magnetic flux when the electronic component is being connected to the electronic device.

The electronic component is becoming closer to the electronic device under an effect of the magnetic force of the first magnetic field, and the magnetic flux of the first magnetic field in the electronic device changes when the electronic component is being connected to the electronic device, where the first magnetic field is generated by the electronic component. From electromagnetic induction principles, it can be learned that a conductor in a changing magnetic flux may generate an electromotive force. That is, as the magnetic flux of the first magnetic field in the electronic device changes, the electronic device generates a first electric signal, and the first electric signal also changes with the magnetic flux.

Further, the electronic device in the embodiment of the present disclosure includes a magnetic medium, a coil that encircles a side of the magnetic medium, and a processor.

The magnetic medium refers to a material in which a magnetization state changes under an effect of a magnetic field. The magnetic medium in the embodiment of the present disclosure may be an iron core. The iron core may use a soft iron or silicon steel material, which is not limited by the embodiment of the present disclosure.

Further, the magnetic medium is magnetized by the first magnetic field under the effect of the first magnetic field, and is physically connected to the electronic component under the effect of the magnetic force of the first magnetic field when the electronic component is being connected to the electronic device.

Further, as a distance between the magnetic medium and the permanent magnet apparatus changes, the magnetic flux of the first magnetic field in the coil also changes accordingly. From electromagnetic induction principles, it can be learned that a conductor in a changing magnetic flux may generate an electromotive force. That is, as the magnetic flux in the coil changes, the coil generates a first electric signal.

The first electric signal may be a current or a voltage, which is not limited by the embodiment of the present disclosure. Further, a direction of the current or a positive or negative pole of the voltage may be determined according to the Lenz's law.

For example, as shown in FIG. 6, the left end of a permanent magnet apparatus E is an N pole, and the right end is an S pole. Distribution of a first magnetic field generated by the permanent magnet apparatus is represented by arrowed solid lines in FIG. 6, A represents an electronic device, c represents a magnetic medium, and a represents a coil. When the permanent magnet apparatus E approaches the electronic device A, the magnetic medium c is magnetized, and the right end of the magnetic medium is the S pole. As a distance between the permanent magnet apparatus E and the electronic device A changes, a magnetic flux of the first magnetic field in the coil a changes. The changed magnetic flux triggers the coil a to generate a first electric signal. In FIG. 6, arrowed dashed lines represent the first magnetic field in the coil, and a current represents the first electric signal. From the Lenz's law, it can be learned that a direction of the current is the direction indicated on the coil in FIG. 6.

Step S202: The electronic device determines whether identification information of a target connection component is the same as a preset identifier if a change of the first electric signal meets a first preset model.

The first electric signal generated by the electronic device changes with the magnetic flux. When the change of the first electric signal meets the first preset model, the electronic device determines whether the identification information of the target connection component is the same as the preset identifier.

The target connection component in the embodiment of the present disclosure may be a data card, may be a memory card, or may be a chip in another intelligent electronic component, which is not limited by the embodiment of the present disclosure. The target connection component is a component used by the electronic device for communication or data transmission.

For example, the target connection component is an SD card, a SIM card, an MMC, a mini SD card, a memory stick, a smart card, a micro SD card, or the like in the electronic device. The identification information of the target connection component may be a serial number of the target connection component, or may be an ID of the target connection component, which is not limited by the embodiment of the present disclosure.

In addition, the electronic component in the embodiment of the present disclosure accommodates or is connected to the target connection component using an electronic interface. There is at least one target connection component, such as two or more than two, which is not further limited by the embodiment of the present disclosure.

Preferably, the electronic interface of the electronic component is a slot. In this case, the target connection component is a data card (or a memory card), and therefore, the data card (or the memory card) may be disposed at a groove of the slot, and a size of the groove may fit a size of the data card (memory card).

Further, no matter how many target connection components are included in the electronic component, processing that may be performed by the electronic device on the target connection components are the same processing, and the electronic device determines whether identification information of a target connection component is the same as a preset identifier, where the preset identifier is an identifier corresponding to the target connection component.

It may be understood that when the distance between the electronic device and the electronic component is becoming shorter, the change of the magnetic flux of the first magnetic field in the electronic device may increase from zero to a maximum value, and then decrease from the maximum value to zero. As the magnetic flux changes, the change of the first electric signal may also take on a specific change trend. When the change trend of the first electric signal meets the first preset model, it indicates that the electronic component is fully connected to the electronic device.

It should be noted that the first preset model in the embodiment of the present disclosure may be a coordinates diagram of the change of the first electric signal, or may be a line graph of a change rate of the first electric signal, which is not limited by the embodiment of the present disclosure.

Further, the electronic device reads the identification information of the target connection component, and then compares the read identification information with a pre-stored preset identifier if the change of the first electric signal meets the first preset model. If the read identification information is the same as the preset identifier, it indicates that the target connection component is an authorized target connection component, conversely, it indicates that the target connection component is not authorized.

Step S203: The electronic device drives the electronic component to be disconnected from the electronic device if the identification information of the target connection component is different from the preset identifier.

Further, if the electronic device determines that the identification information of the target connection component is different from the preset identifier, it indicates that the target connection component is an unauthorized or invalid target connection component, and therefore, the processor in the electronic device generates a second control signal. Under an effect of the second control signal, the electronic device is disconnected from the electronic component, thereby avoiding that an unauthorized target connection component is connected to the electronic device and is used normally, and ensuring security of the electronic device.

Further, the coil generates a third electric signal according to the second control signal, and generates a second magnetic field using the third electric signal, where a magnetic force of the second magnetic field is used to drive the electronic component to be disconnected from the electronic device.

The third electric signal may be a current or a voltage, which is not limited by the embodiment of the present disclosure. Further, a direction of the current or a positive or negative pole of the voltage may be determined according to the Lenz's law.

It may be understood that because the magnetic force of the second magnetic field is used to drive the electronic component to be disconnected from the electronic device, according to same-pole repelling in a magnetic field, it can be learned that pole distribution of the second magnetic field is as follows Poles that are of the electronic component and disposed opposite the electronic device have same magnetism.

For example, as shown in FIG. 7, pole distribution of a permanent magnet apparatus is that the left end is an N pole, and the right end is an S pole. In FIG. 7, E represents the permanent magnet apparatus. Distribution of a first magnetic field is represented by arrowed solid lines, A represents an electronic device, c represents a magnetic medium, and a represents a coil. After generating a second control signal, a processor drives the coil to generate a third electric signal. In FIG. 7, a current is used to represent the third electric signal, and a direction of the current is the direction indicated on the coil in FIG. 7. From a phenomenon that a current generates a magnetic field, it can be learned that after the coil generates the third electric signal, a second magnetic field may be generated around the coil. According to the Lenz's law, it can be determined that poles of the second magnetic field are that the right end is the N pole, and the left end is the S pole. Distribution of the second magnetic field is represented by arrowed dashed lines in FIG. 7. Because the right end of the second magnetic field is the N pole and the left end of the first magnetic field is the N pole, the electronic component is disconnected from the electronic device under an effect of a magnetic force.

Further, in order to determine whether the electronic component is fully disconnected from the electronic device, the electronic device further needs to detect whether a change of the third electric signal in the coil meets a second preset model, and the electronic device drives the coil to stop generating the third electric signal if the change of the second electric signal meets the second preset model.

The second preset model in the embodiment of the present disclosure may be a coordinates diagram of the change of the third electric signal, or may be a line graph of a change rate of the third electric signal, which is not limited by the embodiment of the present disclosure.

Further, no matter how many target connection components are included in the electronic component, processing that may be performed by the electronic device on the target connection components are the same processing, and the electronic device determines whether identification information of a target connection component is the same as a preset identifier, where the preset identifier is an identifier corresponding to the target connection component. So long as determining that the identifier of the target connection component is different from the preset identifier, the electronic device drives the electronic component to be disconnected from the electronic device.

For example, if the electronic device is a mobile phone on which no SIM card is installed and the electronic component is a slot with a permanent magnet characteristic, the slot can accommodate a SIM card. Identification information of the SIM card is an IMSI.

Optionally, in an application scenario in which the mobile phone has only one slot port and the slot with a permanent magnet characteristic can accommodate only one SIM card, the processor in the mobile phone determines whether an IMSI of the SIM card accommodated in the slot is the same as a preset identifier. If the IMSI of the SIM card is different from the preset identifier, the processor drives the slot to be disconnected from the mobile phone, namely, the SIM accommodated in the slot cannot be used normally.

Optionally, in an application scenario in which the mobile phone includes two slot ports, the slot with a permanent magnet characteristic can accommodate only one SIM card, and the mobile phone has two slots for accommodating a SIM card A and a SIM card B respectively, the processor in the mobile phone processes the two slots in the same way as the foregoing application scenario. The SIM card A can be used normally in the mobile phone when the processor in the mobile phone determines that an IMSI of the SIM card A is the same as a preset identifier thereof. The processor drives the slot, which accommodates the SIM card B, to be disconnected from the mobile phone, namely, the SIM card B cannot be used normally in the mobile phone when the processor in the mobile phone determines that an IMSI of the SIM card B is different from a preset identifier thereof.

Optionally, in an application scenario in which the mobile phone includes one slot port and the slot with a permanent magnet characteristic can accommodate at least one SIM card, for example, the slot accommodates two SIM cards, the processor in the mobile phone separately determines whether IMSIs of the two SIM cards are the same as preset identifiers of the SIM cards. In a first possible implementation manner, both the SIMs can be used normally in the mobile phone if the IMSIs of both the SIM cards are the same as the preset identifiers. In a second possible implementation manner, the processor in the mobile phone drives this slot to be disconnected from the mobile phone if the IMSI of one of the SIM cards is different from a preset identifier thereof such that neither of the SIM cards accommodated in the slot can be used normally. In a third possible implementation manner, the mobile phone may keep a state of connection between this slot and the mobile phone, and disables the SIM card whose IMSI is different from the preset identifier if the IMSI of one of the SIM cards is different from a preset identifier thereof. That is, one of the SIM cards can be used normally, and the other SIM card cannot be used normally.

Step S204: The electronic device keeps a state of connection to the electronic component if the identification information of the target connection component is the same as the preset identifier.

Further, if the electronic device determines that the identification information of the target connection component is the same as the preset identifier, it indicates that the target connection component is an authorized or valid target connection component, and therefore, the target connection component can be used normally after connecting to the electronic device such that the electronic device keeps a state of connection to the electronic component.

Figure 9:
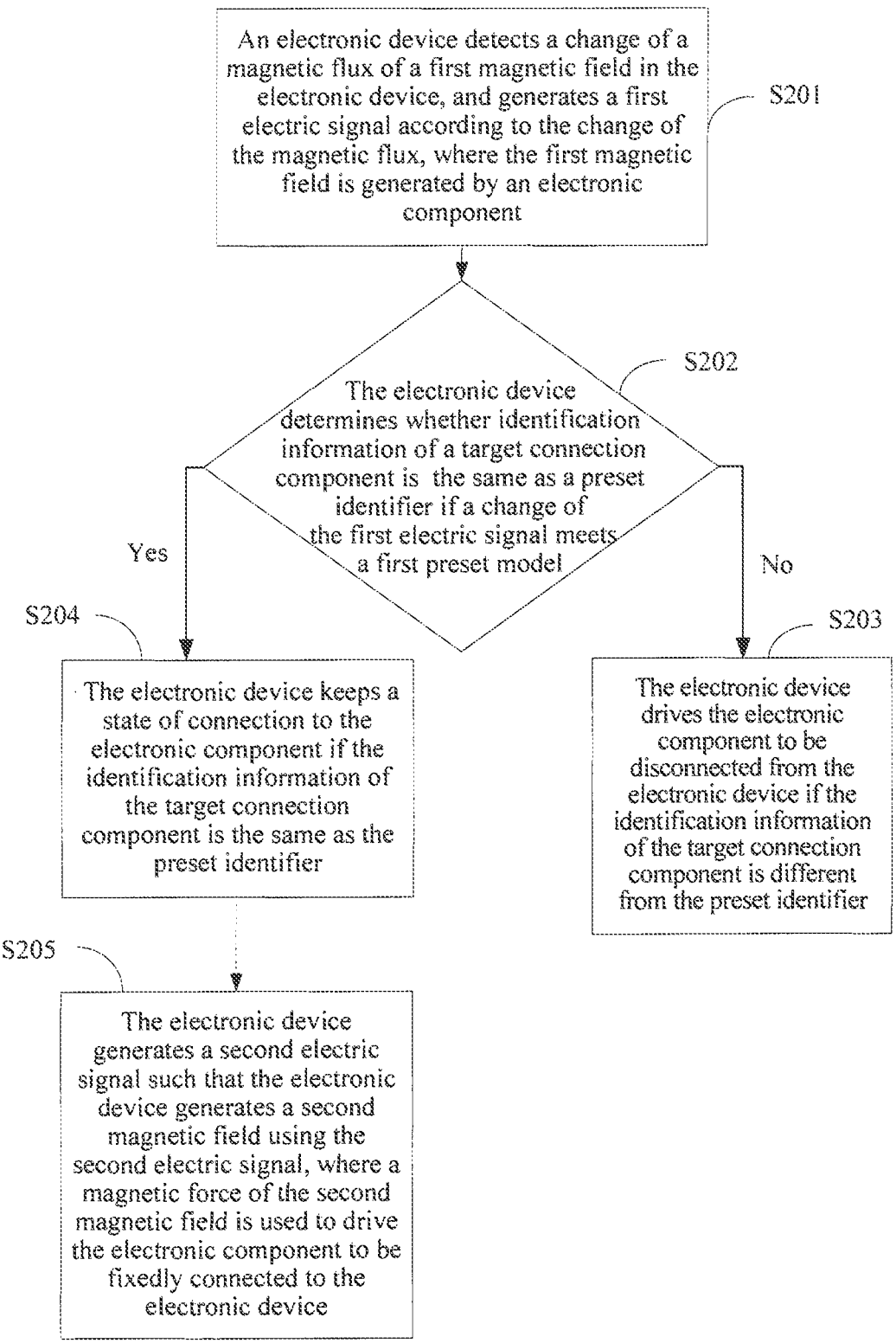
FIG. 9 is a schematic flowchart of a connection/disconnection method according to an embodiment of the present disclosure.

Further, as shown in FIG. 9, after the electronic device determines that the identification information of the target connection component is the same as the preset identifier, namely, after the electronic device completes step S204, the electronic device may further complete step S205

Step S205: The electronic device generates a second electric signal such that the electronic device generates a second magnetic field using the second electric signal, where a magnetic force of the second magnetic field is used to drive the electronic component to be fixedly connected to the electronic device.

Further, in order to make closer connection between the electronic device and the electronic component and prevent a communications fault problem caused by a loose connection between the electronic component and the electronic device, after the electronic device determines that the identification information of the target connection component is the same as the preset identifier, the electronic device generates a second electric signal that is used to make the electronic device be fixedly connected to the electronic component. The coil in the electronic device generates the second electric signal, and generates a second magnetic field using the second electric signal. A magnetic force of the second magnetic field is used to drive the electronic component to be fixedly connected to the electronic device, namely, drive the electronic component to be more closely connected to the electronic device, which is equivalent to a lock-in state between the electronic component and the electronic device, thereby improving usage security of the electronic device.

It should be noted that the second electric signal in the embodiment of the present disclosure may be a current or a voltage, which is not limited by the embodiment of the present disclosure.

The magnetic force of the second magnetic field generated using the second electric signal is used to drive the electronic component to be fixedly connected to the electronic device, the first electric signal is generated according to the change of the magnetic flux of the first magnetic field, and the magnetic force of the first magnetic field is also used to drive the electronic component to be connected to the electronic device. From the Lenz's law, it can be learned that the first electric signal and the second electric signal have a same direction.

It should be noted that step S205 is an optional step. After the electronic device determines that the identification information of the target connection component is the same as the preset identifier, the electronic device and the electronic component may be further enabled to be fixedly connected to each other, or this step may not be performed, which is not limited by the embodiment of the present disclosure.

Figure 10:
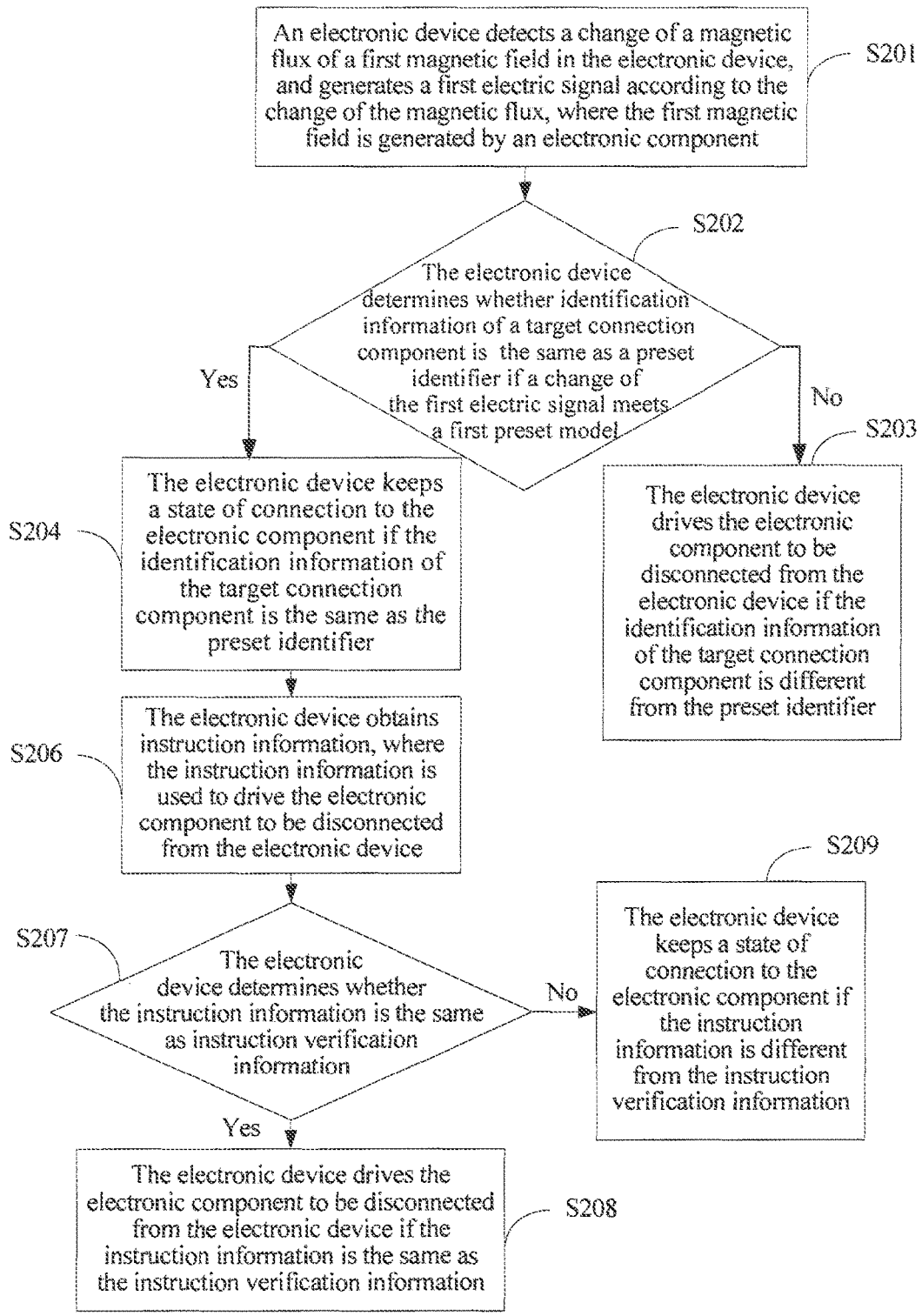
FIG. 10 is a schematic flowchart of a connection/disconnection method according to an embodiment of the present disclosure.

Further, as shown in FIG. 10, after the electronic device determines that the identification information of the target connection component is the same as the preset identifier, namely, after the electronic device completes step S204, the electronic device may further complete steps S206 to S209.

Step S206: The electronic device obtains instruction information, where the instruction information is used to drive the electronic component to be disconnected from the electronic device.

Further, in the embodiment of the present disclosure, when a state of connection is kept between the electronic device and the electronic component, if a user proactively wants to disconnect the electronic component from the electronic device, the user uses the electronic device to enter instruction information that is used to drive the electronic component to be disconnected from the electronic device. Correspondingly, the electronic device obtains the instruction information.

The instruction information entered by the user is information entered by the user using an application on the electronic device, and the instruction information is used to drive the electronic component to be disconnected from the electronic device, and may be a secure digital password, or may be other related information such as a graphical password.

The application refers to a computer program that is developed to complete one or more specific tasks and runs on an operating system. The application in the embodiment of the present disclosure is an application compatible with a system running on the electronic device.

It should be noted that the system running on the electronic device may be an ANDROID operating system, or may be another system such as an IOS, which is not limited by the embodiment of the present disclosure. Because the system running on the electronic device may be an ANDROID operating system, or may be another system, a format of the application also changes with the system.

For example, if the system running on the electronic device is an ANDROID operating system, the application is an APK.

The APK is an application installation file format on an ANDROID operating system. Before being run on an ANDROID device, code of an ANDROID application needs to be compiled first, and then packed into a file identifiable by the ANDROID operating system. This file format that can be identified and run by the ANDROID operating system is APK. An APK file includes a compiled code file (.dex file), file resources (resources), file access (assets), certificates, and a manifest file.

Step S207: The electronic device determines whether the instruction information is the same as instruction verification information.

Further, after the electronic device obtains the instruction information of the user, the electronic device reads and detects the instruction information, namely, the electronic device determines whether the instruction information is the same as the instruction verification information if the electronic device determines that the identification information of the target connection component is the same as the preset identifier.

For example, an application A is installed on the smartphone, and secure digital password input is set in the application A if the electronic device is a smartphone on which a SIM card is installed, and the processor in the mobile phone determines whether the digital password entered by the user is the same as the instruction verification information when the user uses the application A to enter a digital password that drives ejection of the SIM card slot of the mobile phone.

Further, the electronic device compares the read instruction information with the pre-stored instruction verification information. If the instruction information read by the electronic device is the same as the instruction verification information, the instruction information entered by the user is identified successfully, and the electronic device performs step S208, or if the instruction information read by the electronic device is different from the instruction verification information, the instruction information entered by the user is identified unsuccessfully, and the electronic device performs step S209.

Step S208: The electronic device drives the electronic component to be disconnected from the electronic device if the instruction information is the same as the instruction verification information.

If the electronic device successfully identifies the instruction information entered by the user, it indicates that the electronic device is used by the user, and the user proactively wants to eject the target connection component. Therefore, the electronic device drives the electronic component to be disconnected from the electronic device.

Further, after identifying the instruction information successfully, the electronic device generates a third electric signal, and generates a second magnetic field using the third electric signal, where a magnetic force of the second magnetic field is used to drive the electronic component to be disconnected from the electronic device, thereby avoiding that an unauthorized target connection component is connected to the electronic device and is used normally, and ensuring security of the electronic device.

In other approaches, a user can implement connection/disconnection between an electronic device and an electronic component by only triggering a mechanical lever, and further implement changing a target connection component in the electronic device. In the embodiment of the present disclosure, however, disconnection between an electronic component and an electronic device can be implemented only after the electronic device receives instruction information entered by a user and used to drive the electronic component to be disconnected from the electronic device and only after the electronic device identifies the instruction information. In this way, when the user does not enter correct instruction information, the user is unable to change a target connection component in the electronic device, thereby improving security of information in the electronic device.

Further, in other approaches, if the target connection component is a data card or a memory card, when needing to take out the card in the electronic device, the user generally requires an additional tool (such as an ejector pin) to take out the card in the electronic device. Such a tool is generally small-sized and is generally not carried by the user along, which makes the user often feel much inconvenient when the user wants to take out the card in the electronic device. In the embodiment of the present disclosure, however, disconnection between the electronic device and the electronic component is implemented by means of program logic control, and the user no longer requires an additional tool for taking out the card in the electronic device, which facilitates operation of the user.

Step S209: The electronic device keeps a state of connection to the electronic component if the instruction information is different from the instruction verification information.

A state of connection is still kept between the electronic device and the electronic component if the electronic device does not successfully identify the instruction information entered by the user such that the user is unable to change the target connection component in the electronic device, and security of information in the electronic device is improved.

For example, if instruction verification information of a mobile phone of a user A is a secure verification code, when the mobile phone is stolen, a thief can take out a SIM in the mobile phone of the user A only by entering the secure verification code.

This embodiment of the present disclosure provides a connection/disconnection method. An electronic device detects a change of a magnetic flux of a first magnetic field in the electronic device, and generates a first electric signal according to the change of the magnetic flux, where the first magnetic field is generated by an electronic component, a magnetic force of the first magnetic field is used to drive the electronic component to be connected to the electronic device, and the electronic component accommodates or is connected to a target connection component. From electromagnetic induction principles, it can be learned that the change of the magnetic flux of the first magnetic field in the electronic device may cause the electronic device to generate a first electric signal, where the first magnetic field is generated by the electronic component, and the change of the magnetic flux may cause a change of the first electric signal. The electronic device determines whether identification information of the target connection component is the same as a preset identifier if the change of the first electric signal meets a first preset model, and the electronic device drives the electronic component to be disconnected from the electronic device if the identification information of the target connection component is different from the preset identifier.

Using this solution, the electronic device completes, by means of program logic control, determining whether the target connection component accommodated in or connected to the electronic component has been authorized, namely, determining whether the identification information of the target connection component is the same as the preset identifier, and the electronic device drives the electronic component to be disconnected from the electronic device if the target connection component is not authorized. In this way, it is ensured that an unauthorized target connection component cannot be normally used after the target connection component is connected to the electronic device, thereby improving security of the electronic device.

Embodiment 6

Figure 11:
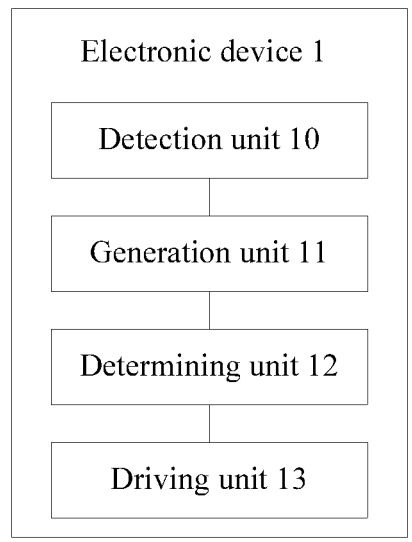
FIG. 11 is a schematic structural diagram of an electronic device according to an embodiment of the present disclosure.

As shown in FIG. 11, this embodiment of the present disclosure provides an electronic device 1, which includes a detection unit 10 configured to detect a change of a magnetic flux of a first magnetic field in the electronic device, where the first magnetic field is generated by an electronic component, a magnetic force of the first magnetic field is used to drive the electronic component to be connected to the electronic device, and the electronic component accommodates or is connected to a target connection component, a generation unit 11 configured to generate a first electric signal according to the change of the magnetic flux detected by the detection unit 10, a determining unit 12 configured to determine whether identification information of the target connection component is the same as a preset identifier if a change of the first electric signal generated by the generation unit 11 meets a first preset model, and a driving unit 13 configured to drive the electronic component to be disconnected from the electronic device 1 if the determining unit 12 determines that the identification information of the target connection component is different from the preset identifier.

The generation unit 11 is further configured to generate a second electric signal if the identification information is the same as the preset identifier such that the electronic device 1 generates a second magnetic field using the second electric signal, where a magnetic force of the second magnetic field is used to drive the electronic component to be fixedly connected to the electronic device 1.

Figure 12:
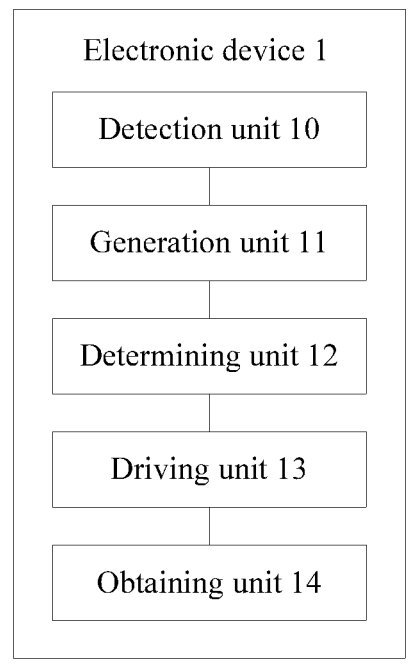
FIG. 12 is a schematic structural diagram of an electronic device according to an embodiment of the present disclosure.

Further, as shown in FIG. 12, the electronic device further includes an obtaining unit 14.

The obtaining unit 14 is configured to obtain instruction information, where the instruction information is used to drive the electronic component to be disconnected from the electronic device 1.

The driving unit 13 is further configured to drive, according to the instruction information obtained by the obtaining unit 14, the electronic component to be disconnected from the electronic device 1.

The determining unit 12 is further configured to determine whether the instruction information obtained by the obtaining unit 14 is the same as instruction verification information.

The driving unit 13 is further configured to drive the electronic component to be disconnected from the electronic device 1 if the determining unit 12 determines that the instruction information is the same as the instruction verification information.

Further, the target connection component is a data card or a memory card, and the identification information of the target connection component is a serial number or an ID of the target connection component.

The embodiment of the present disclosure provides an electronic device 1, which includes a detection unit 10, a generation unit 11, a determining unit 12, and a driving unit 13. The electronic device 1 detects a change of a magnetic flux of a first magnetic field in the electronic device 1, and generates a first electric signal according to the change of the magnetic flux, where the first magnetic field is generated by an electronic component, a magnetic force of the first magnetic field is used to drive the electronic component to be connected to the electronic device 1, and the electronic component accommodates or is connected to a target connection component. From electromagnetic induction principles, it can be learned that the change of the magnetic flux of the first magnetic field in the electronic device 1 may cause the electronic device 1 to generate a first electric signal, where the first magnetic field is generated by the electronic component, and the change of the magnetic flux may cause a change of the first electric signal. The electronic device 1 determines whether identification information of the target connection component is the same as a preset identifier if the change of the first electric signal meets a first preset model, and the electronic device 1 drives the electronic component to be disconnected from the electronic device 1 if the identification information of the target connection component is different from the preset identifier.

Using this solution, the electronic device 1 completes, by means of program logic control, determining whether the target connection component accommodated in or connected to the electronic component has been authorized, namely, determining whether the identification information of the target connection component is the same as the preset identifier, and the electronic device 1 drives the electronic component to be disconnected from the electronic device 1 if the target connection component is not authorized. In this way, it is ensured that an unauthorized target connection component cannot be normally used after the target connection component is connected to the electronic device, thereby improving security of the electronic device 1.

Embodiment 7

Figure 13:
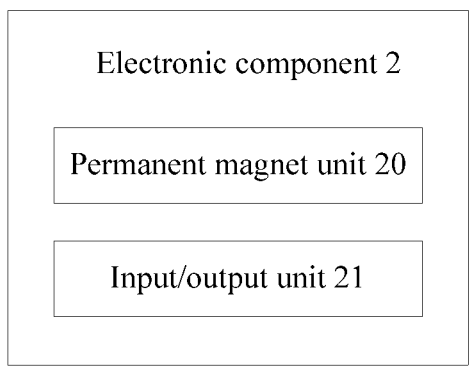
FIG. 13 is a schematic structural diagram of an electronic component according to an embodiment of the present disclosure.

As shown in FIG. 13, this embodiment of the present disclosure provides an electronic component 2, which includes a permanent magnet unit 20 configured to generate a first magnetic field, where a magnetic force of the first magnetic field is used to drive the electronic component 2 to be connected to the electronic device when the electronic component 2 is being connected to an electronic device, and an input/output unit 21 configured to be connected to a target connection component, where the target connection component is used by the electronic device to perform communication or used to perform data transmission with the electronic device.

Further, the target connection component is a data card or a memory card.

The embodiment of the present disclosure provides an electronic component 2, and the electronic component 2 includes a permanent magnet unit 20 and an input/output unit 21. The permanent magnet unit 20 is configured to generate a first magnetic field, where a magnetic force of the first magnetic field is used to drive the electronic component 2 to be connected to the electronic device when the electronic component 2 is being connected to an electronic device. According to this solution, the electronic component 2 includes the permanent magnet unit 20, and the permanent magnet unit 20 can implement connection/disconnection between the electronic component 2 and the electronic device by means of a magnetic force.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The integrated unit may be stored in a computer-readable storage medium when the integrated unit is implemented in the form of a software functional unit and sold or used as an independent product. Based on such an understanding, the technical solutions of the present disclosure essentially, or the part contributing to other approaches, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of the present disclosure. The foregoing storage medium includes any medium that can store program code, such as a universal serial bus (USB) flash drive, a removable hard disk, a read-only memory (ROM), a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An electronic device, comprising:
   a magnetic medium;
   a coil that encircles a side of the magnetic medium; and
   a processor connected to both ends of the coil,
   wherein the magnetic medium is configured to be:
      magnetized by a first magnetic field generated by an electronic component when the electronic device detects connection of the electronic component; and
      connected to the electronic component under an effect of a magnetic force of the first magnetic field when the electronic device detects the connection of the electronic component, wherein the electronic component accommodates or is connected to a target connection component,
   wherein the coil is configured to generate a first electric signal according to a change of a magnetic flux in the coil under an effect of the first magnetic field,
   wherein the first electric signal is used to drive the processor to determine whether identification information of the target connection component accommodated in or connected to the electronic component is the same as a preset identifier, and
   wherein the processor is configured to:
      detect the change of the magnetic flux;
      determine whether the identification information of the target connection component is the same as the preset identifier when a change of the first electric signal meets a first preset model;
      drive the electronic component to be disconnected from the electronic device when the identification information of the target connection component is different from the preset identifier;
      obtain instruction information from a user; and
      drive the electronic component to be physically disconnected from the electronic device using a magnetic force after obtaining the instruction information from the user.

2. The electronic device according to claim 1, wherein the processor is further configured to generate a first control signal when the identification information is the same as the preset identifier, and wherein the coil is further configured to:
   generate a second electric signal according to the first control signal; and
   generate a second magnetic field using the second electric signal, wherein a magnetic force of the second magnetic field is used to drive the electronic component to be fixedly connected to the electronic device.

3. The electronic device according to claim 1, wherein the instruction information from the user comprises a graphical password entered into an application running on the electronic device.

4. The electronic device according to claim 1, wherein after obtaining the instruction information, the processor is further configured to:
   determine whether the instruction information is the same as instruction verification information; and
   drive the electronic component to be disconnected from the electronic device when the instruction information is the same as the instruction verification information.

5. The electronic device according to claim 1, wherein the processor is further configured to generate a second control signal when the identification information is different from the preset identifier, and wherein the coil is further configured to:
   generate a third electric signal according to the second control signal; and
   generate a second magnetic field using the third electric signal, wherein a magnetic force of the second magnetic field is used to drive the electronic component to be disconnected from the electronic device.

6. The electronic device according to claim 5, wherein the processor is further configured to:
   detect whether a change of the third electric signal meets a second preset model; and
   drive the coil to stop generating the third electric signal when the change of the third electric signal meets the second preset model.

7. The electronic device according to claim 6, wherein the second preset model comprises a coordinate diagram of change in the third electrical signal.

8. The electronic device according to claim 6, wherein the second preset model comprises a line graph of a change rate of the third electric signal.

9. The electronic device according to claim 1, wherein the target connection component is a data card or a memory card, and wherein the identification information of the target connection component is a serial number or an identity (ID) of the target connection component.

10. An electronic component, comprising:
    a permanent magnet apparatus; and
    an electronic interface coupled to the permanent magnet apparatus,
    wherein the permanent magnet apparatus is configured to generate a first magnetic field,
    wherein a magnetic force of the first magnetic field is used to drive the electronic component to be connected to an electronic device when the electronic component is being connected to the electronic device, wherein the electronic interface is configured to transfer an identifier to the electronic device when the electronic component is magnetically coupled to the electronic device, wherein the electronic interface is configured to be connected to a target connection component, and wherein the target connection component is used by the electronic device to perform communication or used to perform data transmission with the electronic device.

11. The electronic component according to claim 10, wherein the electronic interface is a slot, and wherein the slot is rigidly connected to the permanent magnet apparatus.

12. The electronic component according to claim 10, wherein the target connection component is a data card or a memory card.

13. A connection/disconnection method, comprising:
detecting, by an electronic device, a change of a magnetic flux of a first magnetic field in the electronic device;
generating a first electric signal according to the change of the magnetic flux, wherein the first magnetic field is generated by an electronic component, wherein a magnetic force of the first magnetic field is used to drive the electronic component to be connected to the electronic device, and wherein the electronic component is connected to a target connection component;
determining, by the electronic device, whether identification information of the target connection component is the same as a preset identifier when a change of the first electric signal meets a first preset model;
driving, by the electronic device, the electronic component to be disconnected from the electronic device when the identification information of the target connection component is different from the preset identifier; and generating a second magnetic field using a second electrical signal, wherein a magnetic force of the second magnetic field drives the electronic component to be magnetically coupled to the electronic device when the identification information is the same as the preset identifier.

14. The connection/disconnection method according to claim 13, wherein the identification information comprises an international mobile subscriber identity (IMSI).

15. The connection/disconnection method according to claim 13, further comprising:
obtaining instruction information, wherein the instruction information is used to drive the electronic component to be disconnected from the electronic device; and
driving, according to the instruction information, the electronic component to be disconnected from the electronic device.

16. The connection/disconnection method according to claim 15, further comprising determining whether the instruction information is the same as instruction verification information, and wherein driving the electronic component to be disconnected from the electronic device comprises driving the electronic component to be disconnected from the electronic device when the instruction information is the same as the instruction verification information.

17. The connection/disconnection method according to claim 13, wherein the target connection component is a data card or a memory card, and wherein the identification information of the target connection component is a serial number or an identity (ID) of the target connection component.

* * * * *